No. 789,837. PATENTED MAY 16, 1905.
B. B. BOWERS.
CANDY MAKING MACHINE.
APPLICATION FILED DEC. 14, 1903.
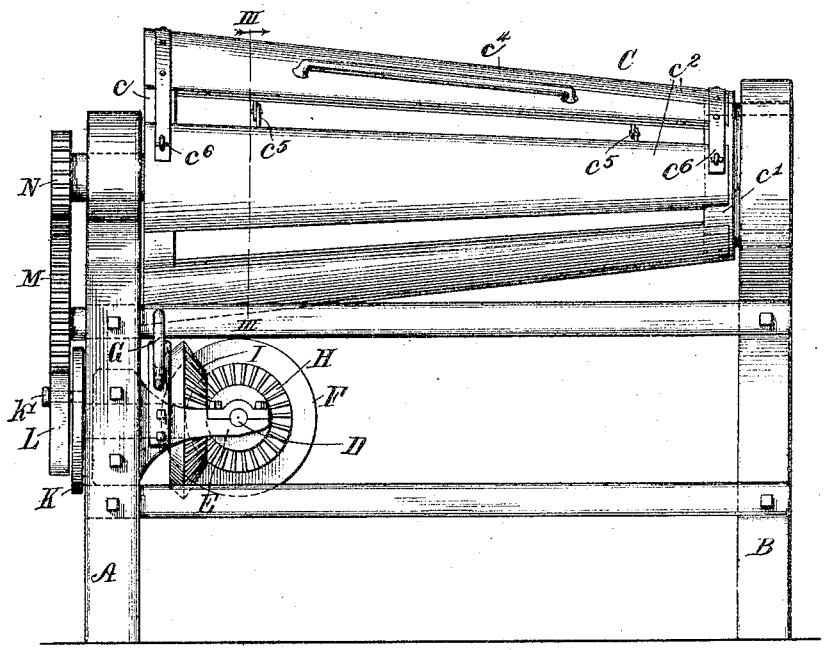
Fig. 1.
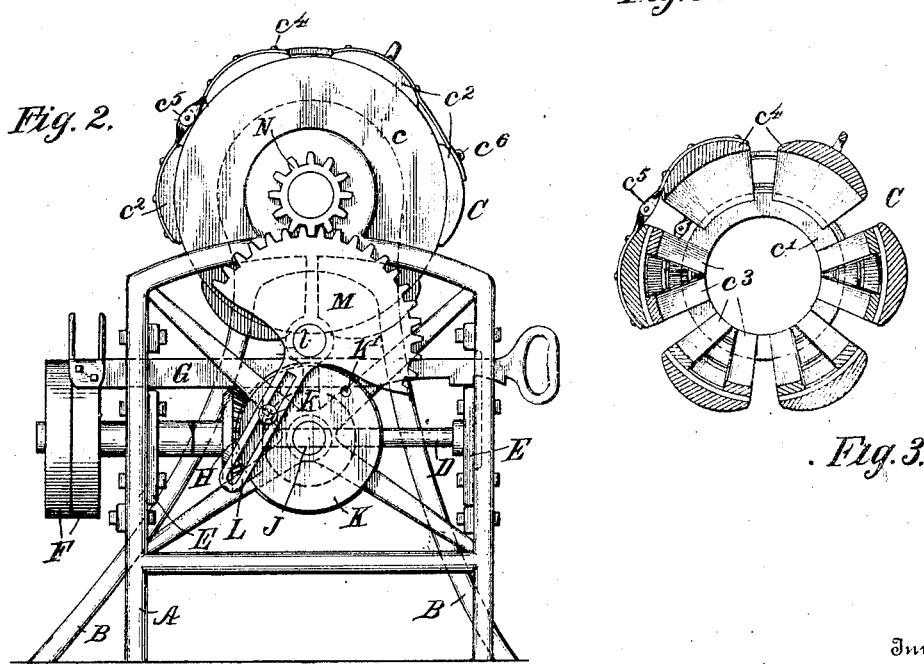
Fig. 2.
Fig. 3.
Witnesses
N. S. Austin
K. M. Cromelin
Inventor
Bose B. Bowers
By Julian C. Dowell
Attorneys No. 789,837.

Patented May 16, 1905.

UNITED STATES PATENT OFFICE.

BOSE B. BOWERS, OF MACON, GEORGIA.

CANDY-MAKING MACHINE.

SPECIFICATION forming part of Letters Patent No. 789,837, dated May 16, 1905.

Application filed December 14, 1903. Serial No. 185,060.

*To all whom it may concern:*

Be it known that I, BOSE B. BOWERS, a citizen of the United States, residing at Macon, in the county of Bibb and State of Georgia, have invented certain new and useful Improvements in Candy-Making Machines; and I do hereby declare the following to be a full, clear, and exact description of the invention, such as will enable others skilled in the art to which it appertains to make and use the same.

In the candy-making art, particularly in the manufacture of stick-candy, the customary practice is to form the plastic mass (obtained from the boiling, stirring or mixing, and cooling of the sugar and other candy ingredients) into a substantially conical shape and maintain this shape by continuous rolling, while an attendant pulls out the thin end of the conical mass into an approximately cylindrical length of required thickness either for cutting into sticks or passing through forming-rollers.

This invention is an improved machine for performing mechanically the operation of working and shaping the batch or plastic mass of candy material and maintaining it in proper shape during the pulling out of the reduced end of the mass.

My improved machine, which I term an "automatic spinning-board," has as its principal feature a horizontally-disposed batch-receptacle, preferably frusto-conical or of other tapered form, with an axial opening in its smaller head and receiving oscillatory motion from appropriate actuating mechanism, whereby the contained material is effectively worked and shaped and rolled over back and forth and constantly kept rounded and pointed or in substantially conical form, while the reduced end of the mass is pulled out through the aforesaid axial opening in the head during the oscillation of the receptacle without danger of twisting the neck in two or breaking, tearing, or injuring the thin outgoing length of candy.

The invention will hereinafter be first fully described with reference to the accompanying drawings, which form a part of this specification, and then particularly pointed out and defined in the annexed claims.

In said drawings, Figure 1 is a side elevation of a candy-machine embodying my invention. Fig. 2 is an end view of the same looking at the left-hand end of Fig. 1. Fig. 3 is a vertical cross-section through the oscillating cone or batch-receptacle, taken on line III III of Fig. 1 looking in the direction of the arrow.

Referring by symbols of reference to the illustrated machine, the letters A and B denote supporting-standards, and C designates the aforesaid oscillating batch-receptacle, in this case frusto-conical horizontally disposed and having its ends suitably journaled in said standards. The said cone or receptacle in the construction illustrated consists of suitable heads $c$ and $c'$, connected by an external shell, here in the form of longitudinal strips $c^2$, though of course an integral conical or tapered shell may be employed, and having internal ribs $c^3$, preferably formed of brass or material suitable for preventing the candy dough from sticking thereto. These ribs also provide an internal roughened surface which aids in the working of the candy. A part of the cone is removable or formed as a lid for the purpose of introducing the batch of plastic candy. This removable part or lid (indicated by the symbol $c^4$) is shown hinged at $c^5$ to the cone at one side and provided with appropriate fastening devices $c^6$ at the other side, whereby the lid may be raised for placing the plastic candy in the receptacle and then closed and fastened down, so as to form a complete closed cone. The smaller end or the head $c'$ is annular, as well as the axle or journal thereof in the standard B, so as to provide the aforementioned axial opening through which the candy is drawn. I do not confine myself to the particular construction here described nor to the conical form illustrated.

While any suitable mechanism may be employed for oscillating the batch-receptacle, the actuating mechanism illustrated as a part of my invention is exceedingly efficient for the purpose and is as follows: The letter D denotes the main driving-shaft, journaled in suitable brackets E, projecting inwardly from the standard A and provided with a pair of pulleys F, one of which is loose and the other fast for the application of power. A belt-shifter G is shown for shifting the belt (not represented) from one pulley to the other. The letter H designates a bevel-pinion on the shaft D, meshing with a bevel-gear I on a stub-shaft J, journaled in a bearing in the standard A at right angles to shaft D or parallel with the axis of the oscillating cone or tapered receptacle C. The stub-shaft J has a disk or plate K provided with an eccentric-pin $k$, engaging a slot in a lever L, which lever is fulcrumed or pivoted on a stud $l$, projecting from the standard A, and has at the opposite or upper side of its pivot a segmental rack or fragmentary gear M, meshing with a pinion N on the axle of the larger head of the cone C. It is obvious that as the disk or plate K rotates the lever L will be rocked thereby, thus swinging the segmental rack or fragmentary gear back and forth, and thereby oscillating the conical or tapered candy-receptacle. The extent of oscillation of the receptacle will depend upon the ratio of the gears M and N and the distance of the pin $k$ from the center of the disk K. As represented in Fig. 2, the receptacle will oscillate through approximately semirevolutions or turn about half-way round and back again. If the pin $k$ be moved farther from the center of the disk K, the amount of motion of the receptacle will be correspondingly increased. For this purpose the disk K is preferably provided with a number of holes to receive said pin, two of such holes being shown in the present case, (designated by the symbol $k'$.) By moving the pin $k$ to the other hole shown the receptacle may be given an oscillation through approximately whole revolutions. By moving the pin still farther away from the center of the disk the receptacle may be oscillated through double revolutions, turning twice around, then back twice around, and so on. The mechanical motion here shown and described is exceedingly efficient and desirable, though other motions may of course be substituted. For example, the lever L might be fulcrumed at its lower end instead of at $l$, and in place of the gears M N said lever might be extended and carry at its upper end a pin working in a slot in an arm on the axle of the receptacle.

As the batch-receptacle oscillates or rocks in the manner above described the batch of plastic candy contained therein is rolled over back and forth, and thus quickly and effectively worked and shaped into rounded and pointed or substantially conical form and constantly maintained in such form while the operator pulls out the neck or reduced end of the mass through the axial opening in the smaller head. At the same time the oscillating motion of the receptacle avoids continuous turning of the mass in the same direction and consequent twisting of the neck or breaking, tearing, or injuring of the reduced end of the mass as it is drawn out through the annular head, so that as the material is pulled out it can be easily and rapidly handled and formed into a stick or other desired shape. The cone or other tapered batch-receptacle is preferably arranged with its axis substantially horizontal, so that the bottom inclines upwardly from the larger to the smaller end. This more perfectly holds the batch in place, allows the gradual pointing thereof or working or rolling into conical or tapered form, and materially assists in the working of the candy by the oscillation of the receptacle.

Having thus fully described my invention, what I claim as new, and desire to secure by Letters Patent of the United States, is—

1. A candy-making machine having, in combination, a horizontally-disposed oscillatory batch-receptacle having an axial opening in one end through which the candy is drawn as the receptacle oscillates, and mechanism for oscillating or rocking said receptacle.

2. A candy-making machine having, in combination, an oscillatory horizontally-disposed batch-receptacle tapered or reduced toward one end and having an axial opening in its smaller end through which the material is drawn, and mechanism for oscillating or rocking said receptacle.

3. A candy-making machine having, in combination, an oscillatory horizontally-disposed batch-receptacle of conical form and having an axial opening in its smaller end through which the material is drawn, and mechanism for oscillating said receptacle.

4. A candy-making machine having, in combination, a horizontally-disposed batch-receptacle adapted to oscillate about a substantially horizontal axis, and tapered or reduced toward one end so that its bottom inclines upwardly from its larger to its smaller end, and having an axial opening in its smaller end for drawing out the material, and mechanism for oscillating said batch-receptacle about its said axis.

5. A candy-making machine having, in combination, a longitudinally-disposed conical batch-receptacle adapted to oscillate about a substantially horizontal axis and having an axial opening in its smaller end for drawing out the material, and mechanism for oscillating said receptacle about said axis.

6. In a candy-making machine, a horizontally-disposed receptacle for plastic candy material having internal longitudinal ribs of material to which the candy will not adhere, and means for turning said receptacle about a horizontally-disposed axis.

7. In a candy-making machine, a horizontally-disposed oscillating tapered receptacle for plastic candy material having a side opening provided with a removable lid or cover, and an annular head at the smaller end through which the material is drawn, and mechanism for oscillating said receptacle.

8. In a candy-making machine, the combination with an oscillatory receptacle, of a rotary driving member, a lever having an eccentric slot-and-pin connection therewith and having at one end a segmental rack or gear, and a gear connected with said receptacle in mesh with the former, whereby on rotation of said member said receptacle is reciprocated.

9. In a candy-making machine, the combination with an oscillatory receptacle, of a rotary driving member, a lever having a slot-and-pin connection therewith and having a segmental rack or gear, and a gear on the axle of said receptacle geared with said segmental rack or gear.

10. A candy-making machine comprising an oscillatory horizontally-disposed receptacle for plastic candy material of tapered or conical form having an axial opening in its smaller end through which the material is drawn, a gear on one of the axles of said receptacle, a gear in mesh therewith, and means for oscillating the latter gear.

11. A candy-making machine comprising an oscillatory horizontally-disposed receptacle for plastic candy material of tapered or conical form having an axial opening in its smaller end through which the material is drawn, a gear on one of the axles of said receptacle, a gear or segmental rack geared therewith and having a part or lever on the opposite side of its pivot, and a rotary driving element having an eccentric slot-and-pin connection with said part or lever.

12. In a candy-making machine, the combination with an oscillatory receptacle, of a rotary driving member, a lever having an eccentric slot-and-pin connection therewith, connections between the lever and receptacle for oscillating or rocking the latter, and means for changing the eccentricity of said slot-and-pin connection for varying the motion of said receptacle.

In testimony whereof I affix my signature in presence of two witnesses.

BOSE B. BOWERS.

Witnesses:
L. D. MOORE,
OLIVER ORR.